C. CREMER.
Felly-Plate.
No. 223,032.　　　　Patented Dec. 30, 1879.
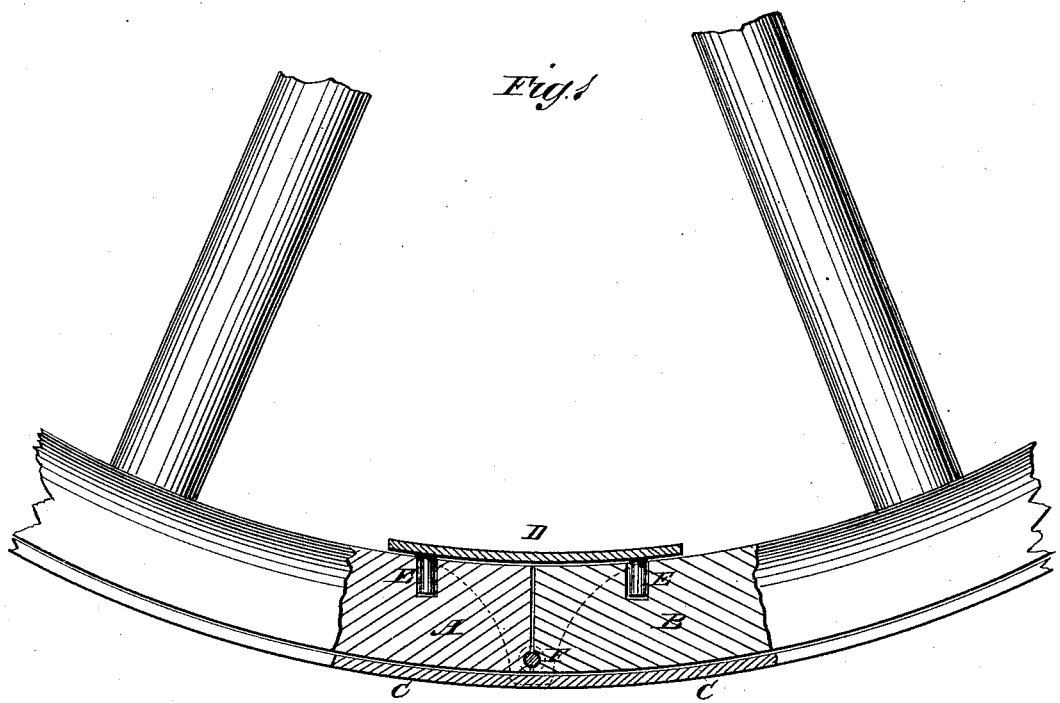
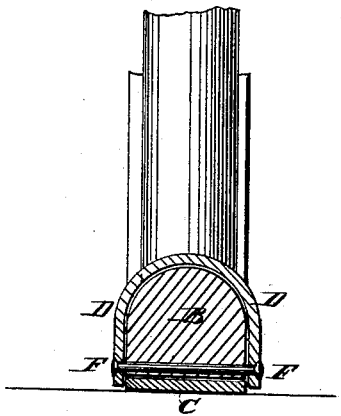
WITNESSES:
Francis McArdle
C. Sedgwick
INVENTOR:
C. Cremer
BY Munn & Co
ATTORNEYS.

UNITED STATES PATENT OFFICE.

CHARLES CREMER, OF COSUMNE, CALIFORNIA.

IMPROVEMENT IN FELLY-PLATES.

Specification forming part of Letters Patent No. 223,032, dated December 30, 1879; application filed June 5, 1879.

*To all whom it may concern:*

Be it known that I, CHARLES CREMER, of Cosumne, in the county of Sacramento and State of California, have invented a new and useful Improvement in Combined Felly-Coupling and Tire-Fastener, of which the following is a specification.

Figure 1 is a side view of a part of a wheel to which my improvement has been applied, partly in section, to show the construction. Fig. 2 is a cross-section of the same.

Similar letters of reference indicate corresponding parts.

The object of this invention is to furnish an improved attachment for vehicle-wheels, to strengthen the felly-joints, and at the same time keep the tires in place upon the wheels, which shall be simple in construction, easily applied to the wheels, and reliable in use.

The invention consists in the combination of the cap-plate, formed to fit upon the rounded inner edge and the sides of the ends of the fellies, provided with pins to enter holes in the inner edges of the said felly ends, and having its side arms projecting to overlap the side edges of the tire, and perforated with countersunk holes to receive the rivet, with the ends of the fellies and with the tire, as hereinafter fully described.

A B represent the adjacent ends of two fellies, and C represents the tire, which parts are constructed and put together in the usual way. As thus constructed the joints between the adjacent ends of the fellies become soon cracked, and are the weak points of the wheels, and are liable to be pressed in by striking against stones or other obstructions in the roadway, giving the wheel a polygonal form.

To strengthen the weak points of the rim, I use the metallic cap D, which is so formed as to fit upon the rounded inner edges and the opposite sides of the adjacent ends A B of the fellies.

To the inner surface of the end parts of the cap-plate D are attached, or upon them are formed, pins E, which enter holes formed to receive them in the inner edge of the felly ends A B, as shown in Fig. 1. The cap-plate D is further secured in place by a rivet, F, which passes through its side arms and through a hole formed in the adjacent ends A B of the fellies, as shown in Figs. 1 and 2.

The holes in the arms of the cap-plate D are countersunk to receive the heads of the rivet F, when its ends are hammered down, and thus leave the outer surfaces smooth.

The ends of the side arms of the cap-plate D project beyond the face of the fellies A B, so as to overlap the side edges of the tire C, as shown in Figs. 1 and 2, and thus keep the said tire in place.

Having thus described my invention, I claim as new and desire to secure by Letters Patent—

The combination of the cap-plate D, formed to fit upon the rounded inner edge and the sides of the ends A B of the fellies, provided with pins E, to enter holes in the inner edges of the said felly ends A B, and having its side arms projecting to overlap the side edges of the tire C, and perforated with countersunk holes to receive the rivet F, with the ends A B of the fellies and with the tire C, substantially as herein shown and described.

CHARLES CREMER.

Witnesses:
W. R. GRIMSHAW,
S. A. HOWELL.